(12) United States Patent
Fujita

(10) Patent No.: US 11,435,532 B2
(45) Date of Patent: Sep. 6, 2022

(54) OPTICAL CONNECTOR AND OPTICAL CONNECTOR REPLACEMENT COMPONENT UNIT

(71) Applicant: Fujikura Ltd., Tokyo (JP)

(72) Inventor: Shunsuke Fujita, Chiba (JP)

(73) Assignee: Fujikura Ltd., Tokyo (JP)

( * ) Notice: Subject to any disclaimer, the term of this patent is extended or adjusted under 35 U.S.C. 154(b) by 9 days.

(21) Appl. No.: 17/261,299

(22) PCT Filed: Jun. 25, 2019

(86) PCT No.: PCT/JP2019/025084
§ 371 (c)(1),
(2) Date: Jan. 19, 2021

(87) PCT Pub. No.: WO2020/017255
PCT Pub. Date: Jan. 23, 2020

(65) Prior Publication Data
US 2021/0263231 A1    Aug. 26, 2021

(30) Foreign Application Priority Data
Jul. 19, 2018    (JP) .............................. JP2018-135648

(51) Int. Cl.
*G02B 6/38* (2006.01)

(52) U.S. Cl.
CPC .................................. *G02B 6/3831* (2013.01)

(58) Field of Classification Search
CPC .................................. G02B 6/38; G02B 6/3831
See application file for complete search history.

(56) References Cited

U.S. PATENT DOCUMENTS

| | | | | |
|---|---|---|---|---|
| 9,891,392 | B2 * | 2/2018 | Kanno | G02B 6/3893 |
| 11,294,125 | B2 * | 4/2022 | Fujita | G02B 6/3885 |
| 11,347,007 | B2 * | 5/2022 | Fujita | G02B 6/3893 |
| 2008/0260333 | A1 * | 10/2008 | Roth | G02B 6/3869 |
| | | | | 385/72 |
| 2013/0301992 | A1 * | 11/2013 | Chayun | G02B 6/385 |
| | | | | 385/136 |
| 2015/0010276 | A1 * | 1/2015 | Good | G02B 6/3882 |
| | | | | 385/78 |
| 2015/0078717 | A1 * | 3/2015 | Lin | G02B 6/3898 |
| | | | | 385/134 |

(Continued)

FOREIGN PATENT DOCUMENTS

| | | |
|---|---|---|
| CN | 1955772 A | 5/2007 |
| JP | 2012-088365 A | 5/2012 |

(Continued)

*Primary Examiner* — Tina M Wong
(74) *Attorney, Agent, or Firm* — Osha Bergman Watanabe & Burton LLP

(57) ABSTRACT

An optical connector includes: a ferrule that holds a tip of an optical fiber; a housing that houses the ferrule; a coupling that releases a latched state of the optical connector by moving to a rear side of the optical connector with respect to the housing; and a tab member that includes an operation section disposed farther toward the rear side of the optical connector than the coupling, and that causes the coupling to move to the rear side of the optical connector with respect to the housing when the operation section is pulled. The tab member is latched from the inside of the coupling.

8 Claims, 8 Drawing Sheets

(56) References Cited

U.S. PATENT DOCUMENTS

2016/0238796 A1  8/2016  Nguyen et al.
2017/0139157 A1* 5/2017  Kanno ............... G02B 6/38875
2017/0371109 A1  12/2017 Gniadek

FOREIGN PATENT DOCUMENTS

| | | |
|---|---|---|
| JP | 2016-062089 A | 4/2016 |
| JP | 6118882 B1 | 4/2017 |
| JP | 2017-134401 A | 8/2017 |
| JP | 6346703 B1 | 6/2018 |
| JP | 2019-053123 A | 4/2019 |

* cited by examiner

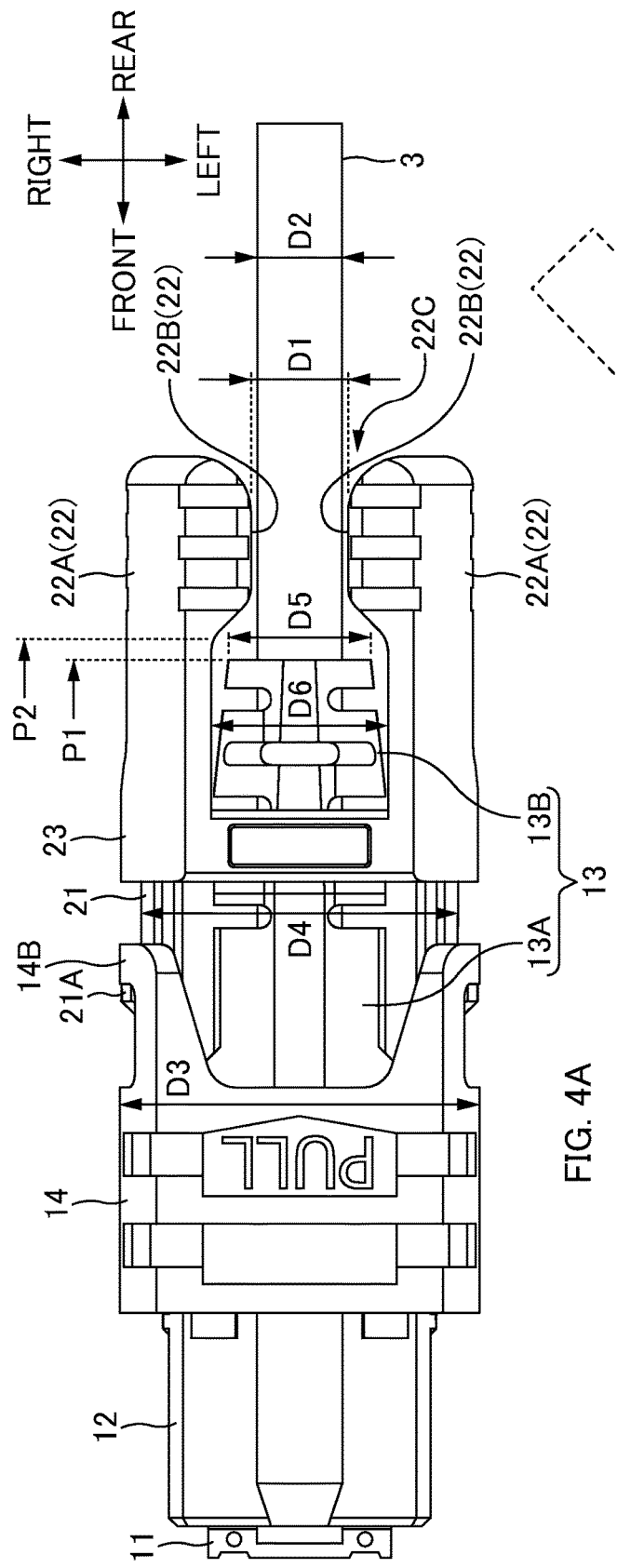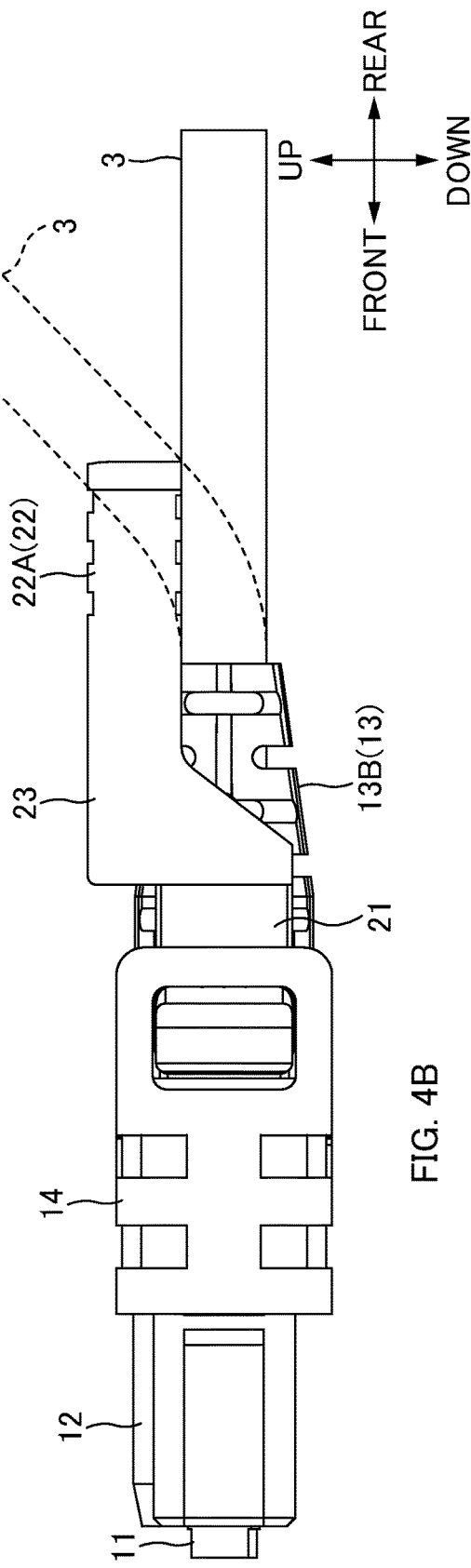
FIG. 4A
FIG. 4B

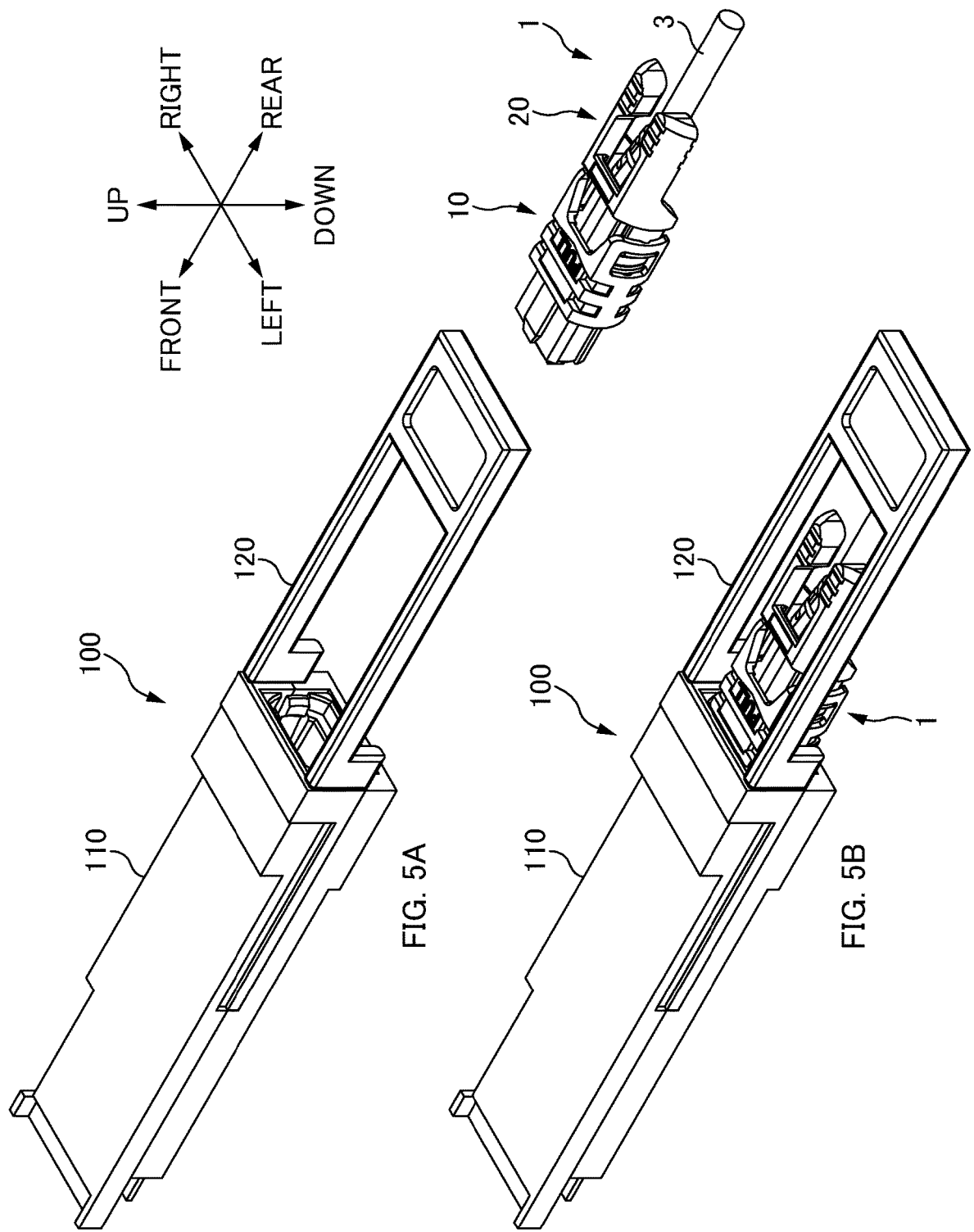

OPTICAL CONNECTOR AND OPTICAL CONNECTOR REPLACEMENT COMPONENT UNIT

TECHNICAL FIELD

The present invention relates to an optical connector and an optical connector replacement component unit.

BACKGROUND

When optical connectors are mounted on an adapter at high density, and the like, it may be difficult for an operator to put a finger between adjacent optical connectors and perform an operation of insertion and removal of the optical connector. Thus, for example, Patent Literatures 1 and 2 disclose that a tab (push-pull tab) for facilitating insertion and removal operations of an optical connector is attached to an optical connector.

Patent Literature

Patent Literature 1: JP 6118882B

Patent Literature 2: JP 2017-134401A

The tab described in Patent Literature 1 is latched from the outside of a coupling, and hence a dimension of the optical connector in a width direction increases.

SUMMARY

One or more embodiments of the present invention reduces a dimension of an optical connector in a width direction.

One or more embodiments of the present invention is an optical connector comprising: a ferrule; a housing that houses the ferrule; a coupling that releases a latched state by moving to a rear side with respect to the housing; and a tab member that includes an operation section located to the rear side than the coupling, and causes the coupling to move to the rear side with respect to the housing by pulling the operation section, wherein the tab member is latched from the inside of the coupling.

Other features of the invention are made clear by the following description and the drawings.

In one or more embodiments of the present invention, a dimension of an optical connector in a width direction can be reduced.

BRIEF DESCRIPTION OF DRAWINGS

FIGS. 1A and 1B are perspective views illustrating a general configuration of an optical connector 1 according to one or more embodiments.

FIG. 2 is an exploded view of the optical connector 1 according to one or more embodiments (a view in which a push-pull tab 20 is removed from a connector body 10).

FIG. 3A is an explanatory diagram (top view) during a pull operation, and FIG. 3B is an explanatory diagram (top view) during a push operation.

FIG. 4A is a top view of the optical connector 1, and FIG. 4B is a side view of the optical connector 1.

FIGS. 5A and 5B are perspective views of a transceiver module 100 and the optical connector 1. FIG. 5A illustrates a separated state, and FIG. 5B illustrates a connected state.

FIG. 6A is a diagram illustrating a state before component replacement, and FIG. 6B is a diagram illustrating a state after the component replacement.

FIGS. 7A and 7B are perspective views illustrating a configuration of an optical connector 1' according to one or more embodiments.

FIG. 8 is a perspective view illustrating a configuration of an optical connector 1" according to one or more embodiments.

DETAILED DESCRIPTION

At least the following matters are made clear from the following description and the drawings.

An optical connector will become clear comprising: a ferrule; a housing that houses the ferrule; a coupling that releases a latched state by moving to a rear side with respect to the housing; and a tab member that includes an operation section located to the rear side than the coupling, and causes the coupling to move to the rear side with respect to the housing by pulling the operation section, wherein the tab member is latched from the inside of the coupling. With such an optical connector, a dimension in a width direction can be reduced.

It is preferable that a rear part of the coupling is located to the rear side than the housing, the tab member is latched to the coupling in the rear part of the coupling, and when the tab member is pushed to a front side, a front end surface of the tab member is brought into contact with the housing and pushes the housing to the front side. In this way, the optical connector can be connected to an adapter and the like by pushing the tab member to the front side.

It is preferable that the coupling includes a latch hole, the tab member includes a latch claw part to be latched into the latch hole, and the latch claw part is movable in a front-rear direction inside the latch hole. In this way, a slight movement of the tab member in the front-rear direction is allowed.

It is preferable that the tab member includes a pair of front protrusions attached to the inside of the coupling, a pair of rear protrusions constituting the operation section, and an intermediate coupling part that couples the pair of the front protrusions and the pair of the rear protrusions, and when the pair of the rear protrusions are pinched in a width direction, a force is applied in a direction in which the pair of the front protrusions are widened outward with the intermediate coupling part as a fulcrum. In this way, the tab member is less likely to come off the coupling.

It is preferable that a gap through which an optical cord extending from the rear side of the housing is configured to pass is formed in the operation section. In this way, a restriction on a bending direction of the optical cord (optical fibers) can be reduced.

It is preferable that the operation section includes a pair of rear protrusions, inner protrusions protruding inward are formed on rear parts of the pair of the rear protrusions, and the gap is formed between the inner protrusions. In this way, the optical connector can be easily held.

It is preferable that a boot extends from the rear side of the housing, and the boot is configured to pass through the gap. In this way, a bending amount in an upper direction can be increased.

An optical connector replacement component unit will become clear, comprising: a coupling that releases a latched state of an optical connector by moving to a rear side with respect to a housing that houses a ferrule; and a tab member that includes an operation section located to the rear side than the coupling, and causes the coupling to move to the rear side with respect to the housing by pulling the operation section, wherein the tab member is latched from the inside of the coupling. With such an optical connector replacement component unit, a dimension of the optical connector in a width direction can be reduced, and attaching and detaching of the optical connector are facilitated.

Figure 1A:
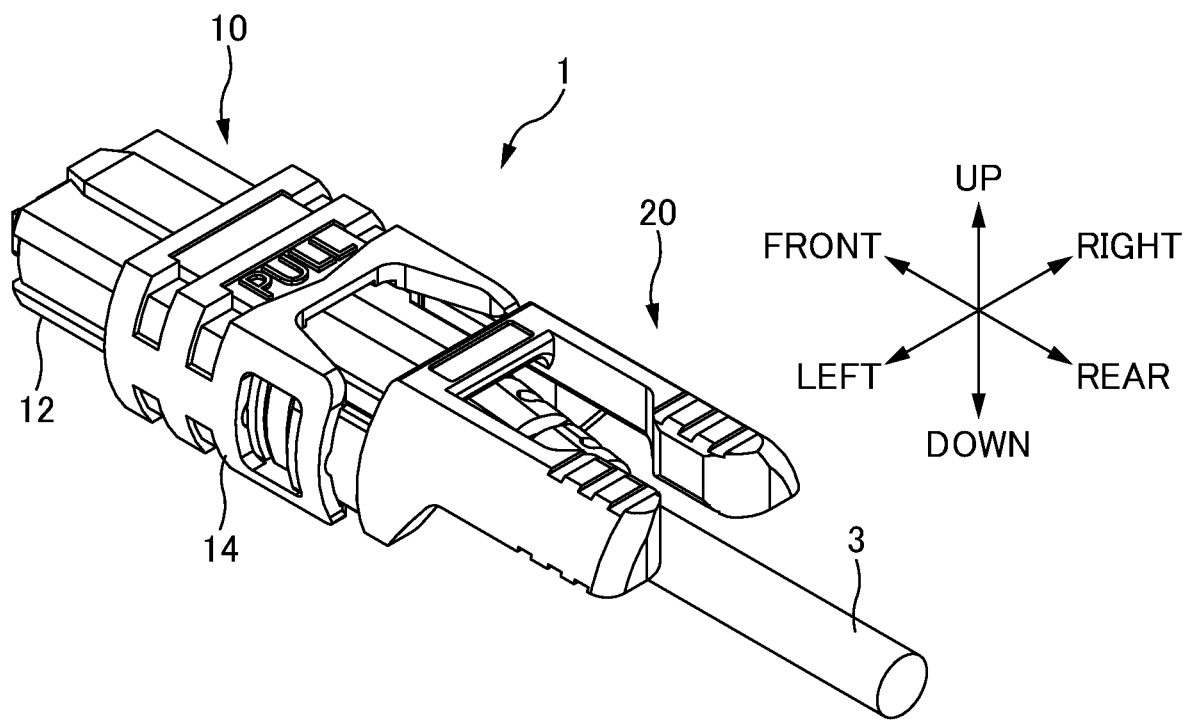
Figure 1B:
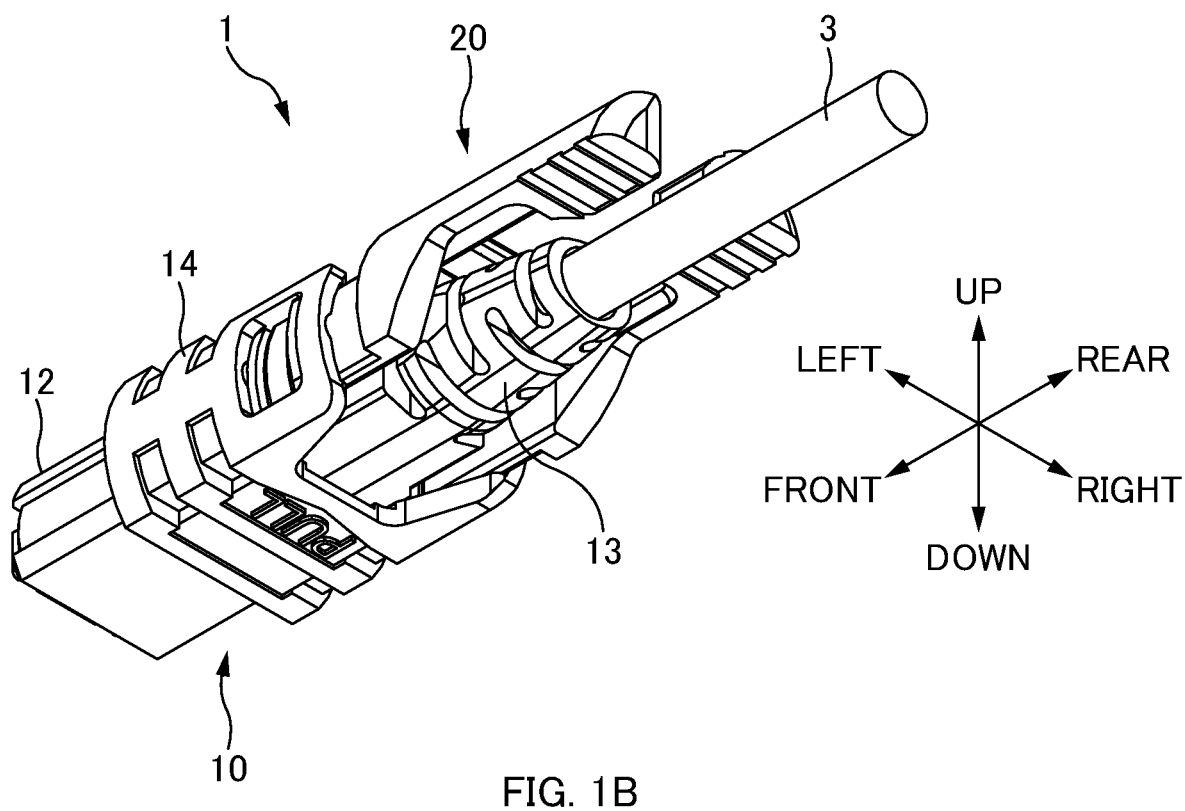
Figure 2:
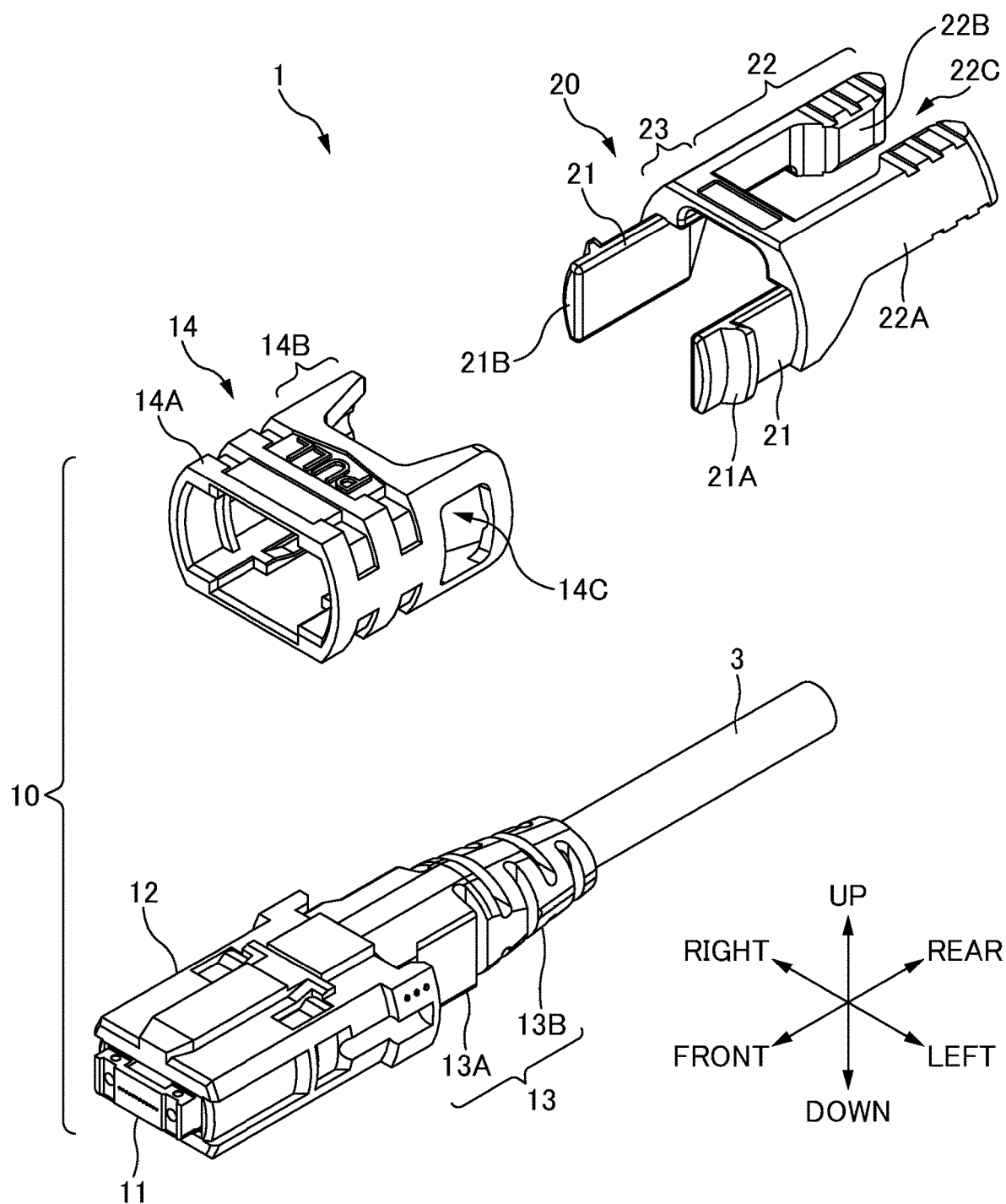

FIGS. 1A and 1B are perspective views illustrating a general configuration of an optical connector 1 according to one or more embodiments. FIG. 2 is an exploded view of the optical connector 1 according to one or more embodiments (a view in which a push-pull tab 20 is removed from a connector body 10).

In the following description, directions will be defined as illustrated in the drawings. In other words, a longitudinal direction (optical axis direction) of an optical cord 3 is a "front-rear direction", a side (tip side of an optical fiber) on which a ferrule 11 of a housing 12 is provided is "front", and an opposite side thereof is "rear". Further, a direction in which a pair of protruding side wall parts 14B of a coupling 14 are aligned is a "left-right direction", a right side when a front side is seen from a rear side is "right", and an opposite side is "left". Note that the left-right direction may also be referred to as a "width direction". Further, a direction orthogonal to the "front-rear direction" and the "left-right direction (width direction)" is an "up-down direction", a side on which an operation section 22 of the tab member 20 is located with respect to the optical cord 3 is "up", and an opposite side is "down".

The optical connector 1 according to one or more embodiments is provided on the optical cord 3 acquired by coating a plurality of optical fibers (optical fiber ribbon) with a sheath, and includes the optical connector body 10 and the tab member 20.

<Optical Connector Body 10>

The optical connector body 10 is a multifiber push-on (MPO) optical connector stipulated in JIS C 5982, IEC 61754-7, and the like. As illustrated in FIG. 2, the optical connector body 10 includes the ferrule 11, the housing 12, a boot 13, and the coupling 14.

The ferrule 11 is a member that holds tips (front ends) of the optical fibers included in the optical cord 3. The ferrule 11 is provided in the housing 12 such that a part of a tip of the ferrule protrudes from a tip of the housing 12 and the ferrule 11 is allowed to move to the front and the rear. A plurality of optical fiber holes are provided in the ferrule 11, and the tips of the optical fibers (bare fibers) are fixed to the respective optical fiber holes.

The housing 12 is a member that retractably houses the ferrule 11. A spring (not illustrated) is provided in an internal space of the housing 12, and the ferrule 11 is biased to the front side by a repulsive force of the spring while a projection (not illustrated) of the housing 12 and a flange part (not illustrated) of the ferrule 11 engage with each other. Note that the housing 12 according to one or more embodiments is shortened, and has a short length in the front-rear direction (the optical connector according to one or more embodiments may be referred to as a short MPO or a mini MPO).

The boot 13 is a member for making a bend of the optical fibers (optical cord 3) gentle, and is provided on the rear side of the housing 12. In other words, the boot 13 extends from the rear side of the housing 12. The boot 13 includes a front part 13A and a rear part 13B. The front part 13A is a fixing part for fixing the boot 13 to the housing 12. In one or more embodiments, a length of the housing 12 in the front-rear direction is short, and thus the front part 13A of the boot 13 is located inside the coupling 14 (specifically, the pair of protruding side wall parts 14B). The rear part 13B is a section that protects the optical cord 3 (optical fibers), and is an elastically deformable section formed of a material having flexibility such as rubber.

The coupling 14 is provided so as to be slidable in the front-rear direction with respect to the housing 12. The coupling 14 is a member that holds a state (hereinafter, referred to as a latched state) where a claw part (not illustrated) of an adapter is hooked on the housing 12 of the optical connector 1. Specifically, the coupling 14 is placed outside the housing 12 (i.e., the coupling 14 is located outside the housing 12), and the claw part of the adapter is sandwiched between the housing 12 and an inner wall surface of the coupling 14 in the latched state. In this way, the claw part of the adapter hooked on the housing 12 can be prevented from opening outward, and the latched state is held. The coupling 14 is a member that releases the latched state of the optical connector 1 by moving to the rear side with respect to the housing 12.

The coupling 14 according to one or more embodiments includes a coupling body 14A and the pair of protruding side wall parts 14B.

The coupling body 14A is a tubular section located around the housing 12.

The protruding side wall parts 14B are wall-shaped sections (rear part of the coupling 14) protruding from the coupling body 14A to the rear side, and are provided (in pair) on respective both end parts of the coupling body 14A in the left-right direction. A latch hole 14C is formed in each of the pair of protruding side wall parts 14B. The latch hole 14C is a hole for hooking a latch claw part 21A (described later) of the tab member 20.

<Tab Member 20>

The tab member 20 is a member for facilitating insertion and removal operations of the optical connector 1, and is attached to the optical connector body 10 (specifically, the coupling 14). The tab member 20 includes a pair of front protrusions 21, the operation section 22, and an intermediate coupling part 23.

The front protrusions 21 are sections protruding from the intermediate coupling part 23 to the front side, and are provided in pair corresponding to the pair of protruding side wall parts 14B of the coupling 14. The pair of front protrusions 21 are located inside the coupling 14 (specifically, the protruding side wall parts 14B). The pair of front protrusions 21 each include the latch claw part 21A and a front end surface 21B.

The latch claw part 21A is a section protruding outward from an outer surface of a corresponding one of the pair of front protrusions 21. The latch claw part 21A is latched into the latch hole 14C of the coupling 14 from the inside. In such a manner, a dimension of the optical connector 1 in the width direction can be suppressed by latching the latch claw part 21A from the inside (described later). When the tab member 20 is pulled to the rear side (when the optical connector 1 is removed), the latch claw part 21A is latched (hooked) into the latch hole 14C of the coupling 14. In this way, the coupling 14 can be slid to the rear side. The latch claw part 21A is allowed to slightly move in the front-rear direction inside the latch hole 14C. In this way, the tab member 20 can slightly move in the front-rear direction with respect to the coupling (a slight movement of the tab member 20 in the front-rear direction is allowed).

The front end surface 21B is an endface on the front side of the front protrusion 21. The front end surface 21B is a contact part to come in contact with the housing 12. Specifically, when the tab member 20 is pushed to the front side (when the optical connector 1 is plugged), the front end surface 21B is brought into contact with the housing 12 (cf.

Figure 3A:
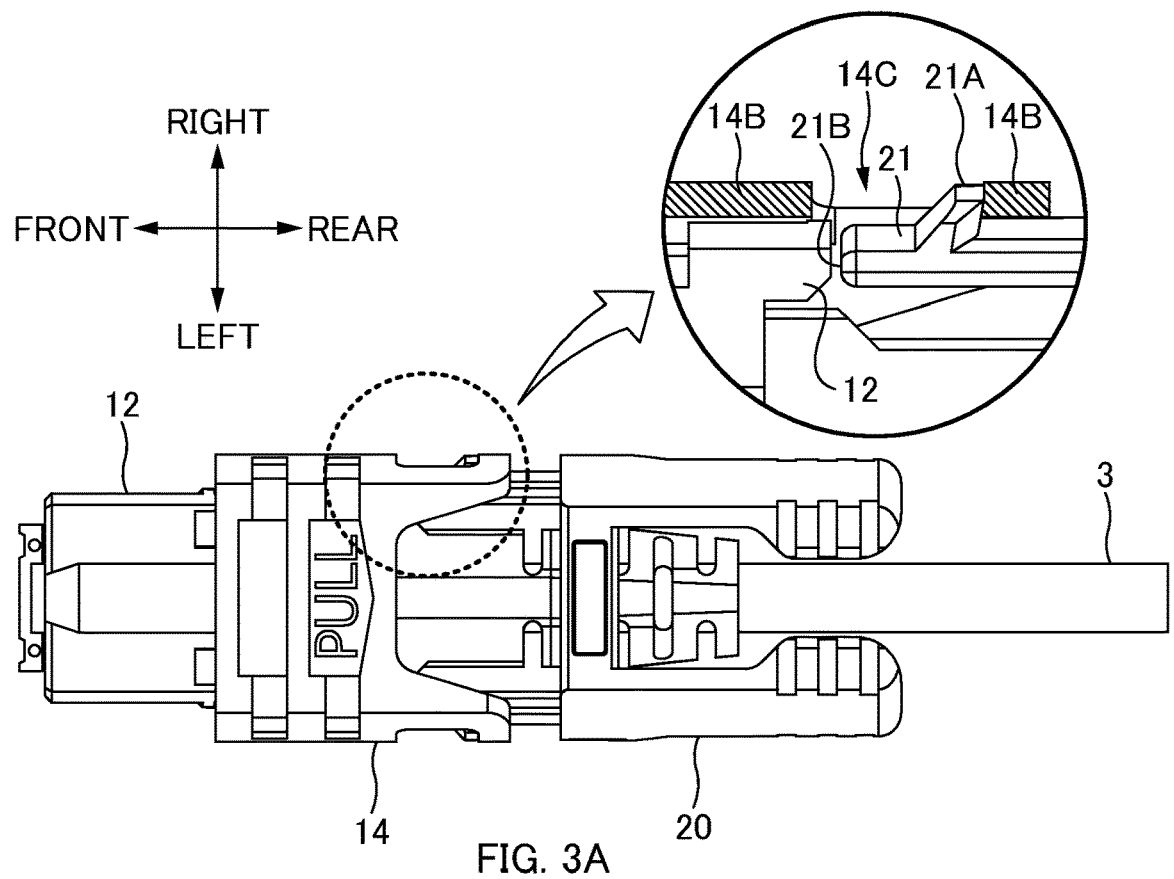
Figure 3B:
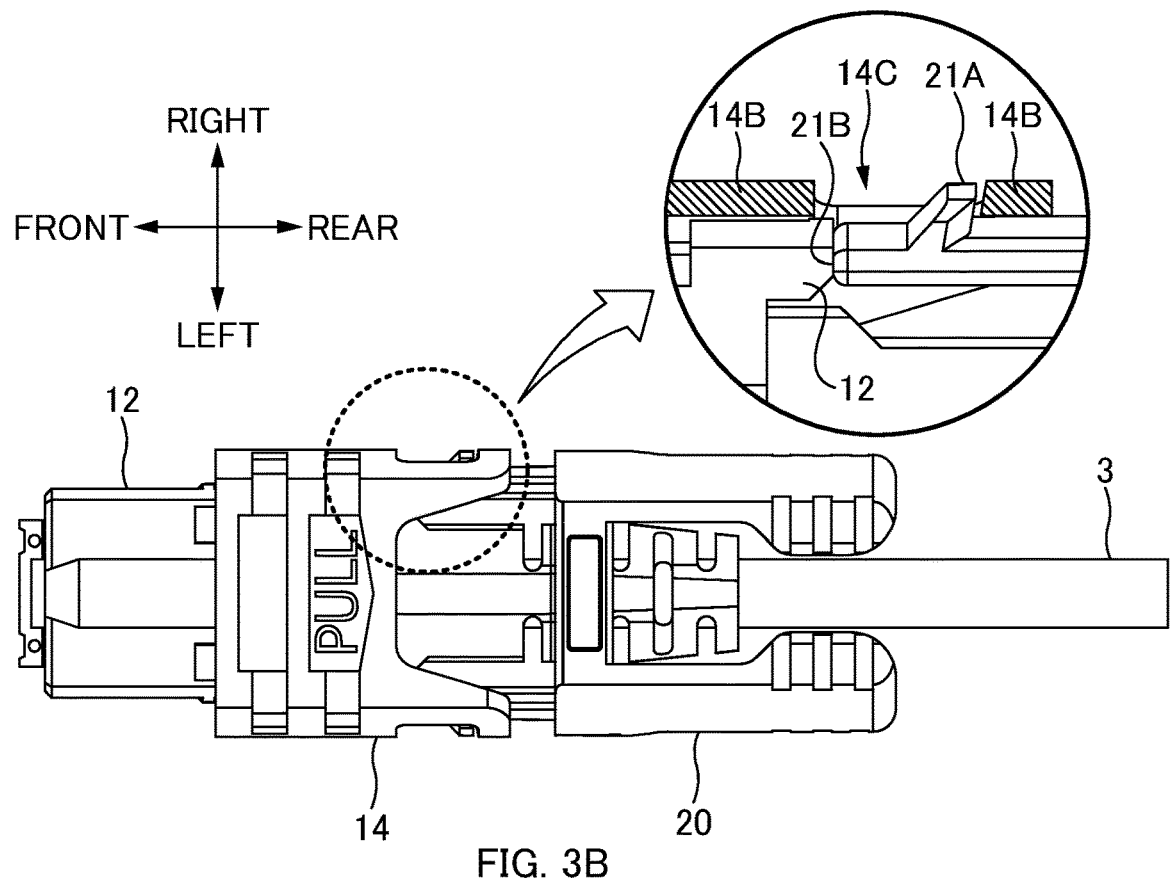

FIG. 3B) and pushes the housing 12 to the front side. In one or more embodiments, the front protrusion 21 is located inside the coupling 14, and thus the front end surface 21B of the tab member 20 can push the housing 12. In one or more embodiments, a length of the housing 12 in the front-rear direction is short, and thus the front end surface 21B of the tab member 20 can push a rear end surface of the housing 12.

The operation section 22 is a section operated with fingers by an operator at the time of insertion (at the time of plugging) and at the time of removal (at the time of unplugging) of the optical connector 1. The operation section 22 is provided closer to the rear side than the intermediate coupling part 23 (i.e., closer to the rear side than the coupling 14), and includes a pair of rear protrusions 22A.

The rear protrusions 22A are sections protruding from the intermediate coupling part 23 to the rear side, and are provided in a pair on both end parts of the intermediate coupling part 23 in the left-right direction. The pair of rear protrusions 22A are provided above the optical cord 3 (cf. FIG. 4B). The pair of rear protrusions 22A include a pair of inner protrusions 22B and a gap 22C.

The pair of inner protrusions 22B are each a section protruding inward from the pair of rear protrusions 22A, and are provided closer to the rear side (rear part) than the center of the rear protrusion 22A in the front-rear direction. By forming the inner protrusions 22B, the operation section 22 is increased in size (is widened), and is more easily operated (more easily pinched). Note that the inner protrusions 22B may not be provided.

The gap 22C is a gap (slit) located between the pair of inner protrusions 22B. In one or more embodiments, the gap 22C is provided in the operation section 22, and thus the optical cord 3 can also be bent upward (in an upper direction) (described later).

The intermediate coupling part 23 is a section that couples the pair of front protrusions 21 and the pair of rear protrusions 22A of the operation section 22. The intermediate coupling part 23 has a function as a fulcrum in the tab member 20. In other words, when the operation section 22 is pinched in the left-right direction, a force is applied in a direction in which the pair of front protrusions 21 are widened in the left-right direction with the intermediate coupling part 23 as a fulcrum. In this way, the tab member 20 is less likely to come off the coupling 14.

In this way, the operation section 22 of the tab member 20 according to one or more embodiments includes the pair of rear protrusions 22A. Then, the inner protrusions 22C protruding inward are formed on the rear part of the pair of rear protrusions 22A, and the gap 22C is formed between the inner protrusions 22C. In this way, the optical connector 1 (tab member 20) can be easily held.

FIG. 3A is an explanatory diagram (top view) during a pull operation, and FIG. 3B is an explanatory diagram (top view) during a push operation. Note that, in FIGS. 3A and 3B, a section (section around the latch hole 14C) surrounded by a broken line is illustrated in an enlarged cross-sectional view.

As described above, since the latch claw part 21A is allowed to slightly move in the front-rear direction inside the latch hole 14C, as illustrated in FIGS. 3A and 3B, a position of the tab member 20 with respect to the coupling 14 is slightly different at the time of pulling and at the time of pushing (cf. the cross-sectional views in FIGS. 3A and 3B).

When the optical connector 1 is removed (at the time of pulling), the operator pinches the operation section 22 of the tab member 20 with fingers and pulls the operation section 22 to the rear side. Then, the tab member 20 moves to the rear side, and thus, as illustrated in FIG. 3A, the latch claw 21A of the tab member 20 is brought into contact with an edge of the latch hole 14C of the coupling 14. In this way, the coupling 14 is pulled to the rear side, and the latched state of the optical connector 1 is released.

When the optical connector 1 is inserted (at the time of pushing), the operator pinches the operation section 22 of the tab member 20 with fingers and pushes the operation section 22 to the front side. Then, the tab member 20 moves to the front side, and thus, as illustrated in FIG. 3B, the front end surface 21B of the tab member 20 is brought into contact with a rear edge of the housing 12. In this way, the housing 12 (optical connector body 10) is pushed to the front side, and the optical connector 1 can be connected to the adapter and the like.

FIG. 4A is a top view of the optical connector 1, and FIG. 4B is a side view of the optical connector 1.

As illustrated in FIG. 4A, in the optical connector 1 according to one or more embodiments, a width D1 of the gap 22C (gap between the inner protrusions 22B facing each other) of the operation section 22 of the tab member 20 is greater than a diameter D2 of the optical cord 3. Thus, the optical cord 3 can pass through the gap 22C. Accordingly, as indicated by a broken line in FIG. 4B, the optical cord 3 can be bent upward (in the upper direction). Note that the pair of rear protrusions 22A of the operation section 22 are provided above the optical cord 3, and thus the optical cord 3 can also be bent in a right direction, a left direction, and a lower direction. In one or more embodiments, the optical cord 3 (optical fiber) can also be bent in the upper direction, and thus a restriction on a bending direction can be reduced.

A clearance (distance between outer endfaces) D3 of the pair of protruding side wall parts 14B of the coupling 14 is greater than a clearance (distance between outer endfaces) D4 of the pair of front protrusions 21 of the tab member 20. In other words, the pair of front protrusions 21 are located inside the coupling 14. In this way, a dimension of the optical connector 1 in the width direction can be suppressed, and such optical connectors 1 can be mounted at high density in the width direction. For example, when the optical connector 1 is connected to a transceiver module, interference with a tab of the transceiver module can be prevented.

FIGS. 5A and 5B are perspective views of a transceiver module 100 and the optical connector 1. FIG. 5A illustrates a separated state, and FIG. 5B illustrates a connected state. The transceiver module 100 includes a transceiver body 110 and a pull tab 120.

The transceiver body 110 has a substantially rectangular parallelepiped shape extending along the front-rear direction. An optical assembly, an electronic circuit, and the like are housed in the transceiver body 110. An optical receptacle to be connected to the optical connector 1 according to one or more embodiments is provided in the transceiver body 110. The optical connector 1 can be inserted into and removed from the transceiver body 110 from the rear side. The pull tab 120 is provided so as to extend from the transceiver body 110 to the rear side, and is connected to both end parts in the left-right direction of a rear side endface of the transceiver body 110.

If the pair of front protrusions 21 are provided so as to be located outside the coupling 14, there is a possibility of interference with the pull tab 120 when the optical connector 1 is connected to (plugged in) the transceiver module 100. In contrast, in one or more embodiments, since a dimension of the optical connector 1 in the width direction is suppressed by the pair of front protrusions 21 of the tab member 20 being located inside the coupling 14, interference with the pull tab 120 of the transceiver module 100 can be prevented.

In one or more embodiments, as illustrated in FIG. 4A, a position P1 of a rear edge of the boot 13 (rear edge of the rear part 13B) in the front-rear direction is located closer to the front side than a position P2 of a front edge of the gap 22C (front edges of the inner protrusions 22B) in the front-rear direction. Furthermore, a width D5 of a rear end of the boot 13 in the left-right direction is smaller than a gap D6 of the pair of rear protrusions 22A (section closer to the front side than the inner protrusions 22B). In this way, the boot 13 can be bent upward, and the optical cord 3 can be bent upward further than a state of a broken line in FIG. 4B (a bending amount in the upper direction can be increased).

In one or more embodiments, an optical connector 1 is constituted by performing component replacement.

Figure 6A:
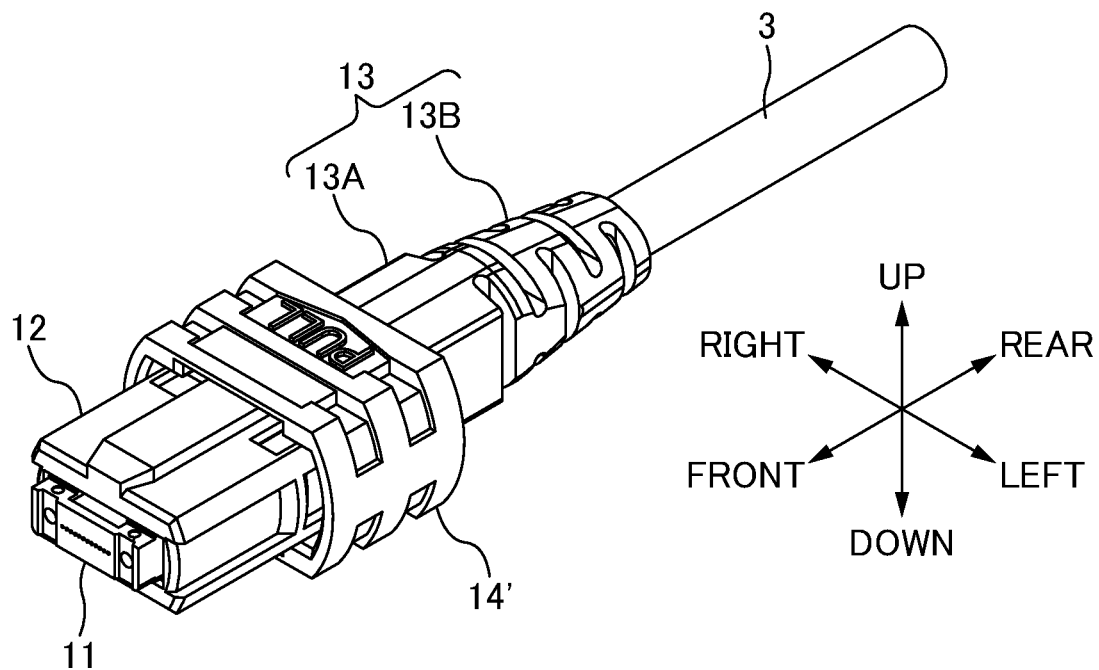
Figure 6B:
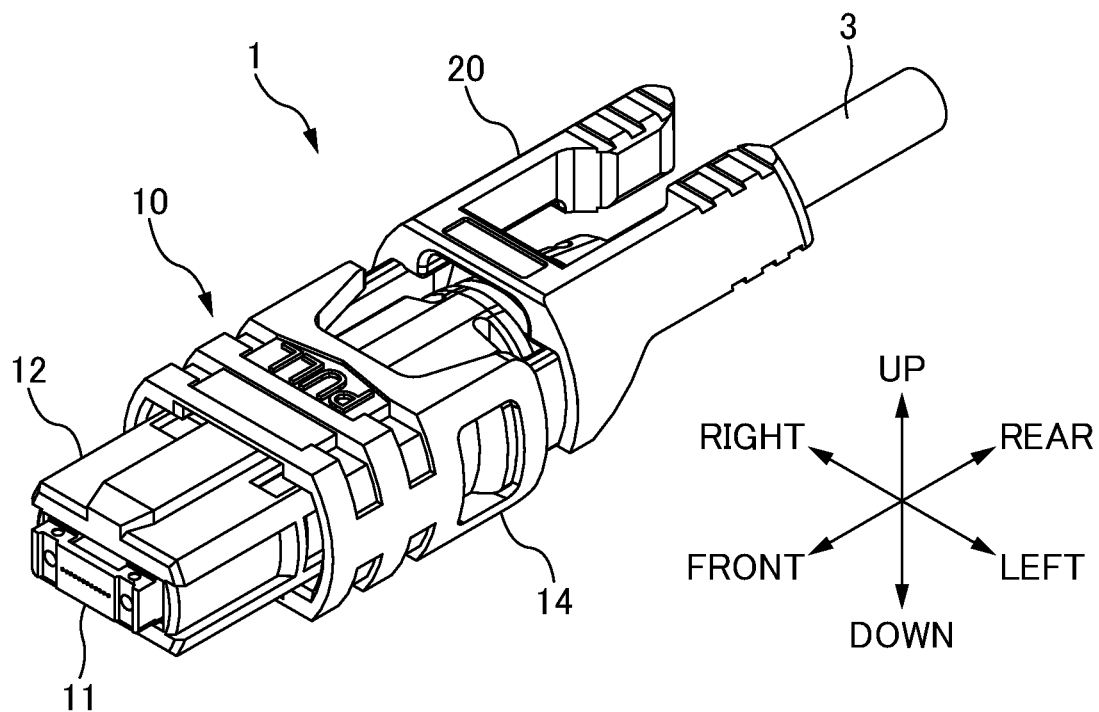

FIG. 6A is a diagram illustrating a state before the component replacement, and FIG. 6B is a diagram illustrating a state after the component replacement.

In FIG. 6A, a coupling 14' is attached to a housing 12. The coupling 14' is constituted by a section corresponding to a coupling body 14A of a coupling 14 (rear protrusions 14B are not provided).

First, the coupling 14' is removed from an optical connector (housing 12) in FIG. 6A, and the coupling 14 is attached to the housing 12. Next, a tab member 20 is plugged into the coupling 14 from the rear side, and a latch claw part 21A of the tab member 20 is latched into each latch hole 14C of the coupling 14 from the inside. In this way, as illustrated in FIG. 6B, the optical connector 1 according to one or more embodiments is assembled. Note that the coupling 14 and the tab member 20 correspond to an optical connector replacement component unit.

In this way, the optical connector 1 according to one or more embodiments can be easily assembled (component replacement can be easily performed) by using the coupling 14 and the tab member 20. A coupling is replaced by an optical connector replacement component unit (replaced with the coupling 14), and the tab member 20 is attached to the coupling 14, and thus attaching and detaching of an optical connector are facilitated as compared to the optical connector (FIG. 6A) before the replacement.

Figure 7A:
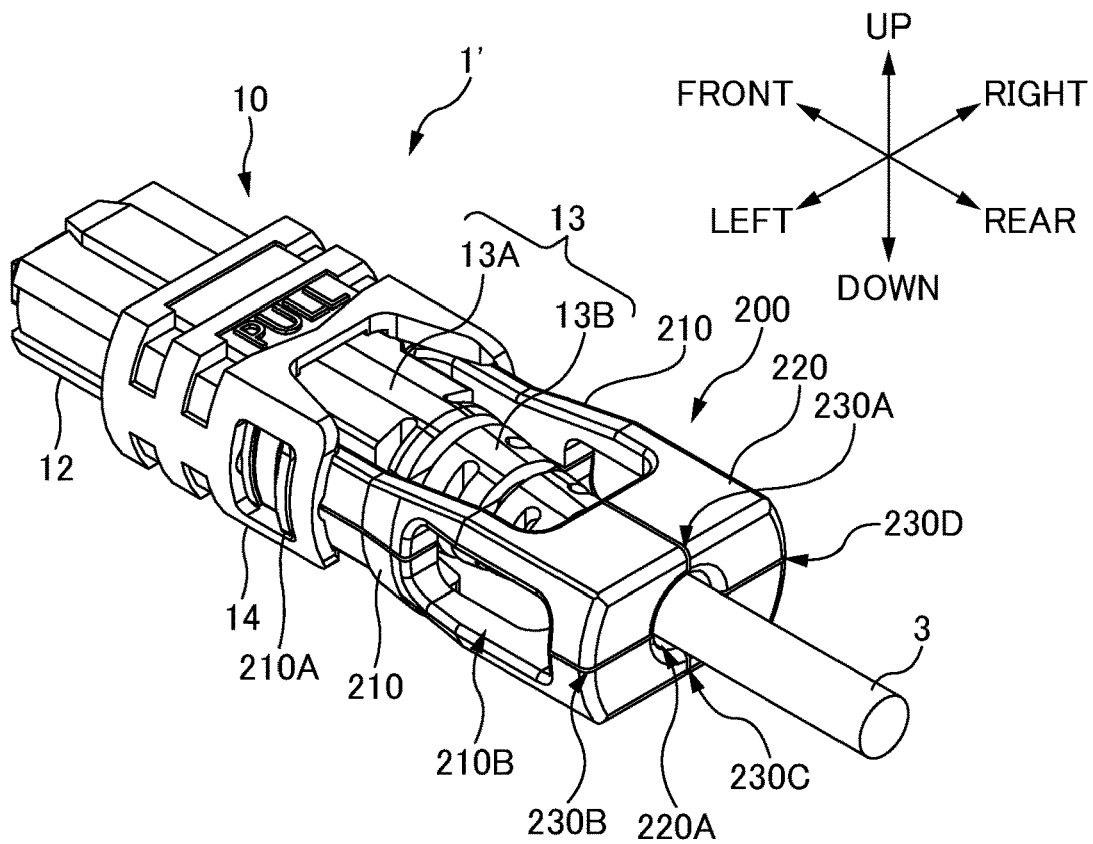
Figure 7B:
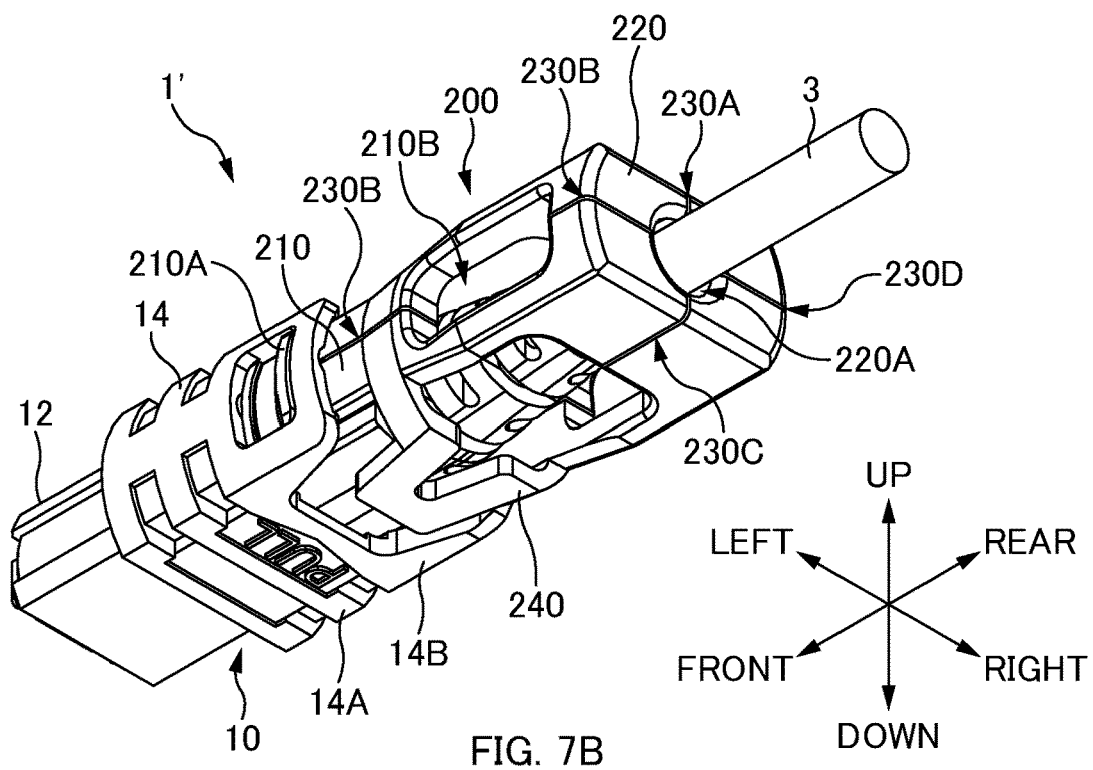

FIGS. 7A and 7B are perspective views illustrating a configuration of an optical connector 1' according to one or more embodiments. A part having the same configuration as that in the above-described embodiments is denoted by the same reference sign, and description will be omitted. The optical connector 1' according to one or more embodiments includes a tab member 200.

The tab member 200 includes a pair of front protrusions 210, an operation section 220, slits 230A to 230D, and a coupling part 240. The tab member 200 is formed of an elastically deformable material.

The front protrusions 210 are a section protruding from the operation section 220 to the front side, and are provided in pair on both ends of the operation section 220 in the left-right direction. A front part of the pair of front protrusions 210 is located inside a coupling 14 (specifically, protruding side wall parts 14B). The pair of front protrusions 210 each include a latch claw part 210A and an opening 210B.

The latch claw part 210A is a section protruding outward from an outer surface of the corresponding one of the pair of front protrusions 210. The latch claw part 210A is latched into a corresponding latch hole 14C of the coupling 14 from the inside. In this way, the tab member 200 is attached to the coupling 14. When the tab member 200 is pulled to the rear side (when the optical connector 1 is removed), the latch claw part 210A is latched (hooked) into the latch hole 14C of the coupling 14, and thus the coupling 14 can slide to the rear side. The latch claw part 210A is allowed to slightly move in the front-rear direction inside the latch hole 14C. In this way, the tab member 200 can slightly move in the front-rear direction with respect to the coupling 14.

Note that, when the tab member 200 is pushed to the front side (when the optical connector 1 is plugged), front end surfaces (not illustrated) of the pair of front protrusions 210 are brought into contact with a housing 12 and push the housing 12 to the front side, similarly to the embodiments described above.

The openings 210B are provided so as to penetrate side walls of the pair of front protrusion 210 in the left-right direction. A width in the up-down direction and a width in the left-right direction of each opening 210B are greater than a diameter of an optical cord 3. The opening 210B is a section for letting the optical cord 3 escape when the optical cord 3 is bent in the right direction or the left direction. In this way, even when the optical cord 3 is bent in the right direction or the left direction, expansion of the operation section 220 can be suppressed.

The operation section 220 is a section operated by an operator with fingers at the time of insertion (at the time of plugging) and at the time of removal (at the time of unplugging) of the optical connector 1. The operation section 220 according to one or more embodiments is provided so as to surround the optical cord 3, and a through hole 220A for insertion of the optical cord 3 in the front-rear direction is formed in a rear end surface of the operation section 220.

The slits 230A to 230D are gaps formed in the operation section 220 (and a part of the pair of front protrusions 210). The slit 230A is formed so as to divide a section of the operation section 220 above the through hole 220A into two in the left-right direction. Similarly, the slit 230C is formed so as to divide a section of the operation section 220 below the through hole 220A into two in the left-right direction. The slit 230B is formed so as to divide a section of the operation section 220 on the left side of the through hole 220A into two in the up-down direction. Similarly, the slit 230D is formed so as to divide a section of the operation section 220 on the right side of the through hole 220A into two in the up-down direction. Note that the slit 230B and the slit 230D are also formed in the pair of front protrusions 210 (to a position where the slits do not reach the latch claw parts 210A) via the openings 210B.

As illustrated in FIGS. 7A and 7B, in one or more embodiments, a width of each of the slits (the slits 230A to 230D) is smaller than a diameter (D2 in FIG. 4A) of the optical cord 3. However, by bending the optical cord 3, the operation section 220 can be deformed (elastically deformed) so as to spread each of the slits with the optical cord 3. In this way, the optical cord 3 can protrude from the through hole 220A to the outside of the operation section 220 (i.e., the optical cord 3 can pass each of the slits). In one or more embodiments, the slits are provided in the four directions of up, down, left, and right with respect to the optical cord 3 (the through hole 220A), and thus the optical cord 3 can be bent in each of the directions. By holding the bent optical cord 3 between the pair of front protrusions 210 or in the opening 210B, the operation section 220 returns to an original shape, and thus the operation section 220 can be operated while the optical cord 3 is bent.

The coupling part 240 is a section that couples the pair of front protrusions 210, and is provided on the lower side (lower end) of the pair of front protrusions 210 in one or more embodiments. The tab member 200 is integrally constituted by the coupling part 240 being provided. The coupling part 240 is provided at a distance from the coupling 14, and is formed into a protruding shape (inverted V shape) on the front side corresponding to a shape (recessed shape constituted by a rear edge of a coupling body 14A and inner walls of the pair of protruding side wall parts 14B) of a rear end part of the coupling 14. In this way, the tab member 200 is allowed to move in the front-rear direction. Note that a shape of the coupling part 240 is not limited to this. For example, the coupling part 240 may have a shape so as to linearly couple the pair of front protrusions 210.

In this way, in the optical connector 1' according to one or more embodiments, the slits 230A to 230D are provided in the tab member 200, and thus the optical cord 3 can be bent in the up-down direction and the left-right direction. Thus, a restriction on a bending direction can be reduced. Since the pair of front protrusions 210 are located inside the coupling 14, a dimension of the optical connector 1' in the width direction can be suppressed, and such optical connectors 1' can be mounted at high density in the width direction, similarly to the embodiments described above.

Figure 8:
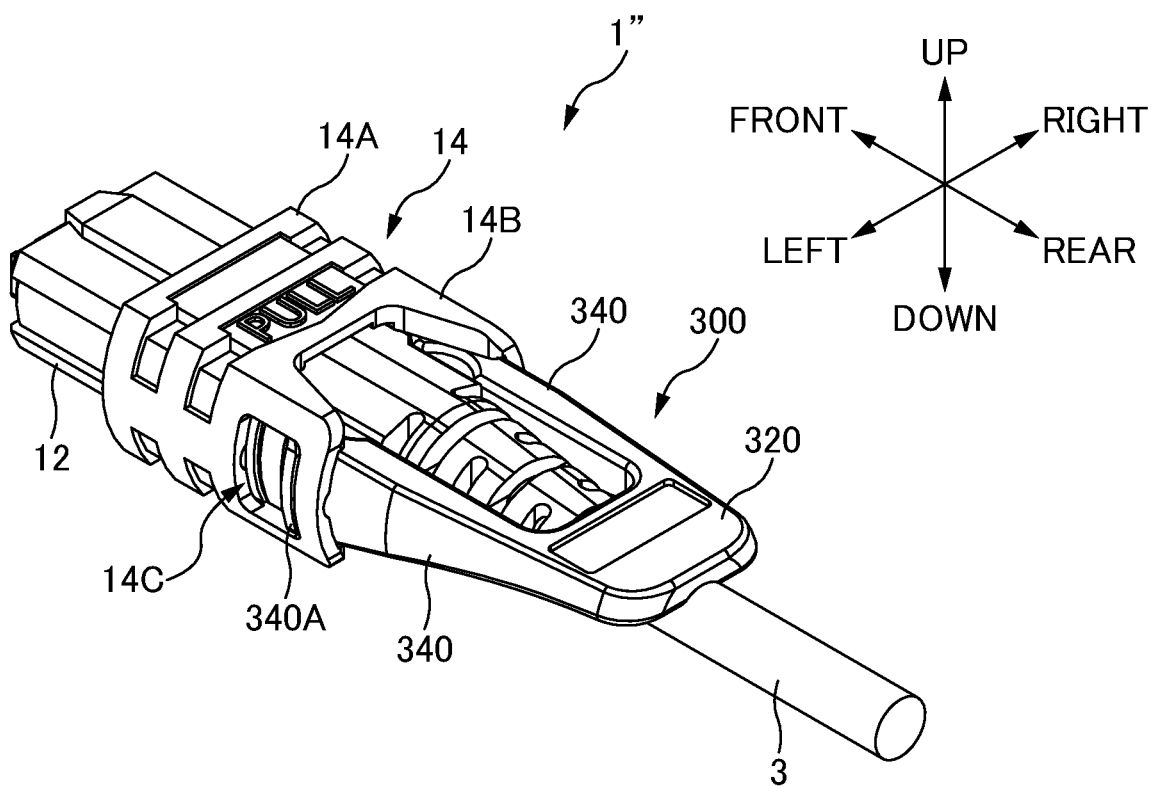

FIG. 8 is a perspective view illustrating a configuration of an optical connector 1" according to one or more embodiments. A part having the same configuration as that in the above-described embodiments is denoted by the same reference sign, and description will be omitted. The optical connector 1" according to one or more embodiments includes a tab member 300. The tab member 300 includes an operation section 320 and a pair of arm parts 340.

The operation section 320 is a section operated by an operator with fingers at the time of insertion (at the time of plugging) and at the time of removal (at the time of unplugging) of the optical connector 1. The operation section 320 is also a section that couples the pair of arm parts 340 above an optical cord 3.

The pair of arm parts 340 extend from respective both end parts of the operation section 320 in the left-right direction to the front side. Tips of the pair of arm parts 340 are located inside a coupling 14 (specifically, protruding side wall parts 14B). The pair of arm parts 340 each include a latch claw part 340A. The latch claw parts 340A are provided on the tip (front end) parts of the pair of arm parts 340 so as to protrude outward from outer surfaces in the left-right direction. Then, the latch claw parts 340A are latched into latch holes 14C of the protruding side wall parts 14B of the coupling 14 from the inside. In this way, the tab member 300 is attached to the coupling 14. When the tab member 300 is pulled to the rear side (when the optical connector 1 is removed), the latch claw part 340A is latched (hooked) into the latch hole 14C of the coupling 14, and thus the coupling 14 can be made to slide to the rear side.

Note that, when the tab member 300 is pushed to the front side (when the optical connector 1 is plugged), front end surfaces (not illustrated) of the arm parts 340 are brought into contact with a housing 12 and push the housing 12 to the front side.

In the optical connector 1" according to one or more embodiments, a slit is not provided in the operation section 320 of the tab member 300, and thus the optical cord 3 is prevented from being bent in the upper direction.

However, since the pair of arm parts 340 of the tab member 300 are located inside the coupling 14 and the tab member 300 is latched from the inside of the coupling 14, a dimension of the optical connector 1" in the width direction can be suppressed, and such optical connectors 1" can be mounted at high density in the width direction, similarly to the embodiments described above.

Other Embodiments

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical connector;
3: Optical cord;
10: Optical connector body;
11: Ferrule;
12: Housing;
13: Boot;
13A: Front part;
13B: Rear part;
14: Coupling;
14A: Coupling body;
14B: Protruding side wall part;
14C: Latch hole;
20: Tab member;
21: Front protrusion;
21A: Latch claw part;
21B: Front end surface;
22: Operation section;
22A: Rear protrusion;
22B: Inner protrusion;
22C: Gap (slit);
23: Intermediate coupling part;
100: Transceiver module;
110: Transceiver body;
120: Pull tab;
140: Coupling;
141: Outer protrusion;
200: Tab member;
210: Front protrusion;
210A: Latch claw part;
210B: Opening;
220: Operation section;
220A: Through hole;
230A to 230D: Slit;
240: Coupling part;
300: Tab member;
320: Operation section;
340: Arm part;
340A: Latch claw part.

The invention claimed is:
1. An optical connector comprising:
a ferrule that holds a tip of an optical fiber;
a housing that houses the ferrule;
a coupling that releases a latched state of the optical connector by moving to a rear side of the optical connector with respect to the housing, wherein the rear side is opposite to a front side of the optical connector that includes the tip of the optical fiber; and
a tab member that includes an operation section disposed farther toward the rear side of the optical connector than the coupling, and that causes the coupling to move to the rear side of the optical connector with respect to the housing when the operation section is pulled, wherein the tab member includes a pair of front protrusions attached to an inside of the coupling, each of the pair of front protrusions includes a latch claw part protruding outward from an outer surface of a corresponding one of the pair of front protrusions, and each of the latch claw parts latches to a corresponding latch hole disposed in the coupling.

2. The optical connector according to claim 1, wherein a rear part of the coupling is disposed farther toward the rear side of the optical connector than the housing, the tab member is latched to the coupling in the rear part of the coupling, and when the tab member is pushed to the front side of the optical connector, a front end surface of the tab member contacts the housing and pushes the housing toward the front side of the optical connector.

3. The optical connector according to claim 1, wherein each of the latch claw parts is movable, in a front-rear direction of the optical connector, inside the latch hole.

4. The optical connector according to claim 1, wherein the tab member further includes:

a pair of rear protrusions that constitute the operation section; and an intermediate coupling part that couples the pair of the front protrusions and the pair of the rear protrusions, and when the pair of the rear protrusions are pinched in a width direction of the optical connector, a force is applied in a direction in which the pair of the front protrusions are widened outward with the intermediate coupling part as a fulcrum.

5. The optical connector according to claim 1, wherein the operation section includes a gap that passes an optical cord that extends from a rear side of the housing.

6. The optical connector according to claim 5, wherein the operation section includes a pair of rear protrusions, inner protrusions protrude inward from rear parts of the pair of the rear protrusions, and the gap is disposed between the inner protrusions.

7. The optical connector according to claim 5, wherein a boot extends from the rear side of the housing, and the boot passes through the gap.

8. An optical connector replacement component unit, comprising:

a coupling that releases a latched state of an optical connector by moving to a rear side of the optical connector with respect to a housing that houses a ferrule that holds a tip of an optical fiber, wherein the rear side is opposite to a front side of the optical connector that includes the tip of the optical fiber; and a tab member that includes an operation section disposed farther toward the rear side of the optical connector than the coupling, and that causes the coupling to move to the rear side of the optical connector with respect to the housing when the operation section is pulled, wherein the tab member includes a pair of front protrusions attached to an inside of the coupling, each of the pair of front protrusions includes a latch claw part protruding outward from an outer surface of a corresponding one of the pair of front protrusions, and each of the latch claw parts protrudes through a corresponding latch hole disposed in the coupling.

* * * * *